United States Patent
Stevens et al.

(10) Patent No.: US 9,784,472 B2
(45) Date of Patent: Oct. 10, 2017

(54) MANAGING HOT WATER DELIVERY

(71) Applicant: INTERNATIONAL BUSINESS MACHINES CORPORATION, Armonk, NY (US)

(72) Inventors: Mark B. Stevens, Austin, TX (US); John D. Wilson, Houston, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 391 days.

(21) Appl. No.: 13/677,051

(22) Filed: Nov. 14, 2012

(65) Prior Publication Data

US 2014/0131462 A1    May 15, 2014

(51) Int. Cl.
| | |
|---|---|
| *F24H 9/20* | (2006.01) |
| *F24D 19/10* | (2006.01) |
| *G06Q 10/06* | (2012.01) |
| *G05D 23/185* | (2006.01) |
| *G05D 23/19* | (2006.01) |
| *G06Q 50/06* | (2012.01) |

(52) U.S. Cl.
CPC ....... *F24H 9/2007* (2013.01); *F24D 19/1006* (2013.01); *G05D 23/185* (2013.01); *G05D 23/1905* (2013.01); *G05D 23/1917* (2013.01); *G06Q 10/06* (2013.01); *G06Q 50/06* (2013.01); *Y02B 10/20* (2013.01); *Y02B 10/70* (2013.01)

(58) Field of Classification Search
USPC ....... 122/13.01; 237/8 A; 700/282, 283, 300
See application file for complete search history.

(56) References Cited

U.S. PATENT DOCUMENTS

| | | | | |
|---|---|---|---|---|
| 5,504,306 | A * | 4/1996 | Russell | F24H 9/2028 219/481 |
| 6,795,644 | B2 * | 9/2004 | Bradenbaugh | 392/463 |
| 2006/0186215 | A1 * | 8/2006 | Logan | 236/12.2 |
| 2009/0092384 | A1 | 4/2009 | Luo et al. | |
| 2009/0139466 | A1 * | 6/2009 | Takayama | F24H 9/2035 122/14.2 |
| 2010/0280679 | A1 * | 11/2010 | Fildes | G05D 23/1905 700/299 |
| 2011/0042470 | A1 * | 2/2011 | Deivasigamani et al. | 236/51 |
| 2012/0018417 | A1 | 1/2012 | Chen et al. | |
| 2012/0239539 | A1 * | 9/2012 | Shen | 705/34 |

FOREIGN PATENT DOCUMENTS

WO    2007059618 A1    5/2007

* cited by examiner

*Primary Examiner* — Alissa Tompkins
*Assistant Examiner* — John Bargero
(74) *Attorney, Agent, or Firm* — Paul S. Drake

(57) ABSTRACT

A method, system or computer usable program product for controlling an on-demand hot water heater including providing a plurality of nodes for receiving hot water from an on-demand hot water heater in a hot water delivery system, receiving a demand with a node identifier for hot water at a node, determining a hot water temperature for the node from a centralized database, the database including a set of node identifiers with a corresponding set of preset hot water temperatures, and controlling a temperature of hot water flowing from the water heater based on the determined hot water temperature.

18 Claims, 9 Drawing Sheets

| NODE 405 | DESCRIPTION 410 | PRESET 415 | MAX 420 | DROP 425 | AMBIENT 430 | DELAY 435 |
|---|---|---|---|---|---|---|
| 1A | WASHER - HOT | 120 | 125 | 4 | 1 | 10 |
| 1B | WASHER - WARM | 100 | 110 | 4 | 1 | 10 |
| 1C | WASHER - COOL | 90 | 95 | 4 | 1 | 10 |
| 2 | MASTER SHOWER | 110 | 115 | 5 | 2 | 15 |
| 3 | MASTER BATH | 115 | 120 | 5 | 2 | 15 |
| 4 | MASTER SINK | 115 | 120 | 5 | 2 | 15 |
| 5 | CHILD SHOWER | 105 | 108 | 4 | 1 | 12 |
| 6 | CHILD SINK | 110 | 115 | 4 | 1 | 12 |
| 7 | KITCHEN SINK | 120 | 125 | 3 | 1 | 8 |
| 8A | DISHWASHER - STD. | 130 | 130 | 3 | 1 | 8 |
| 8B | DISHWASHER - ECO. | 120 | 120 | 3 | 1 | 8 |

MANAGING HOT WATER DELIVERY

BACKGROUND

1. Technical Field

The present invention relates generally to managing hot water delivery, and in particular, to a computer implemented method for managing the delivery of hot water to multiple nodes at selective temperatures.

2. Description of Related Art

Running hot and cold water has been a standard feature of homes and businesses in many parts of the world. Hot water can be provided using several different types of appliances. One of the most common types of hot water appliances is a storage water heater where water is heated and stored in a hot water tank. As a result, a large amount of hot water is quickly available for use as needed. Another type of hot water appliance is a tankless water heater. This heats water on demand rather than storing water, thereby eliminating the cost of keeping a tank of hot water heated at all times. However, it may be difficult for a tankless water heater to heat water as fast as it is demanded as there is no buffer capacity. There are many other relative advantages and disadvantages to these two types of water heaters such as installation cost, maintenance cost, space required, water temperature stability, etc.

There are many other types of water heaters including solar water heaters, point of demand tankless water heaters, heat exchange based water heaters, shared boilers, combination boilers that combine heater water with central heating, etc. Each of these types of water heaters has different advantages and disadvantages relative to other types of water heaters.

SUMMARY

The illustrative embodiments provide a method, system, and computer usable program product for controlling an on-demand hot water heater including providing a plurality of nodes for receiving hot water from an on-demand hot water heater in a hot water delivery system, receiving a demand with a node identifier for hot water at a node, determining a hot water temperature for the node from a centralized database, the database including a set of node identifiers with a corresponding set of preset hot water temperatures, and controlling a temperature of hot water flowing from the water heater based on the determined hot water temperature.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 4 is a block diagram of a node database in which various embodiments may be implemented;

DETAILED DESCRIPTION

Processes and devices may be implemented and utilized to managing the delivery of hot water to multiple nodes at selective temperatures. These processes and apparatuses may be implemented and utilized as will be explained with reference to the various embodiments below.

Figure 1:
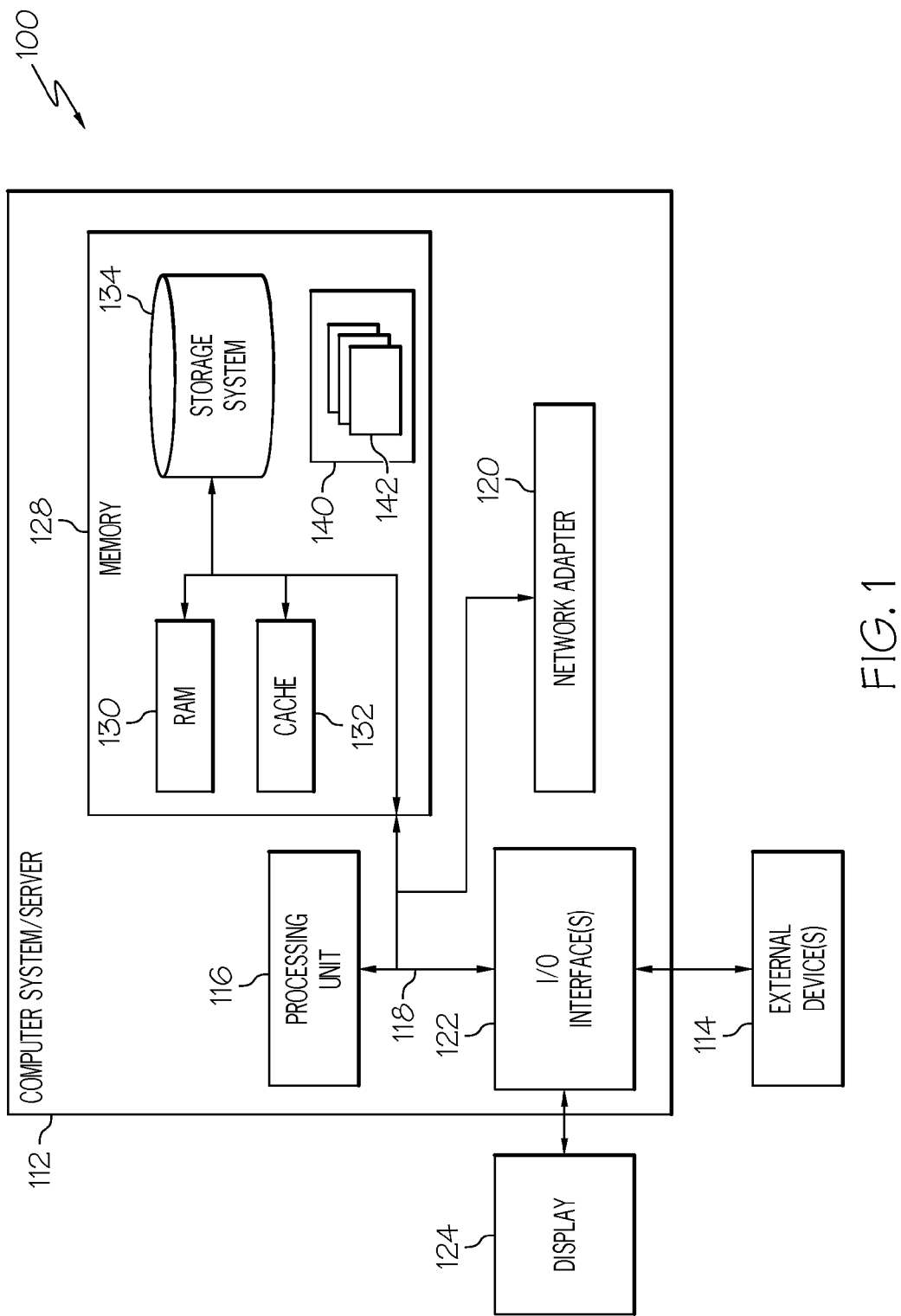
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing the delivery of hot water to multiple nodes at selective temperatures.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
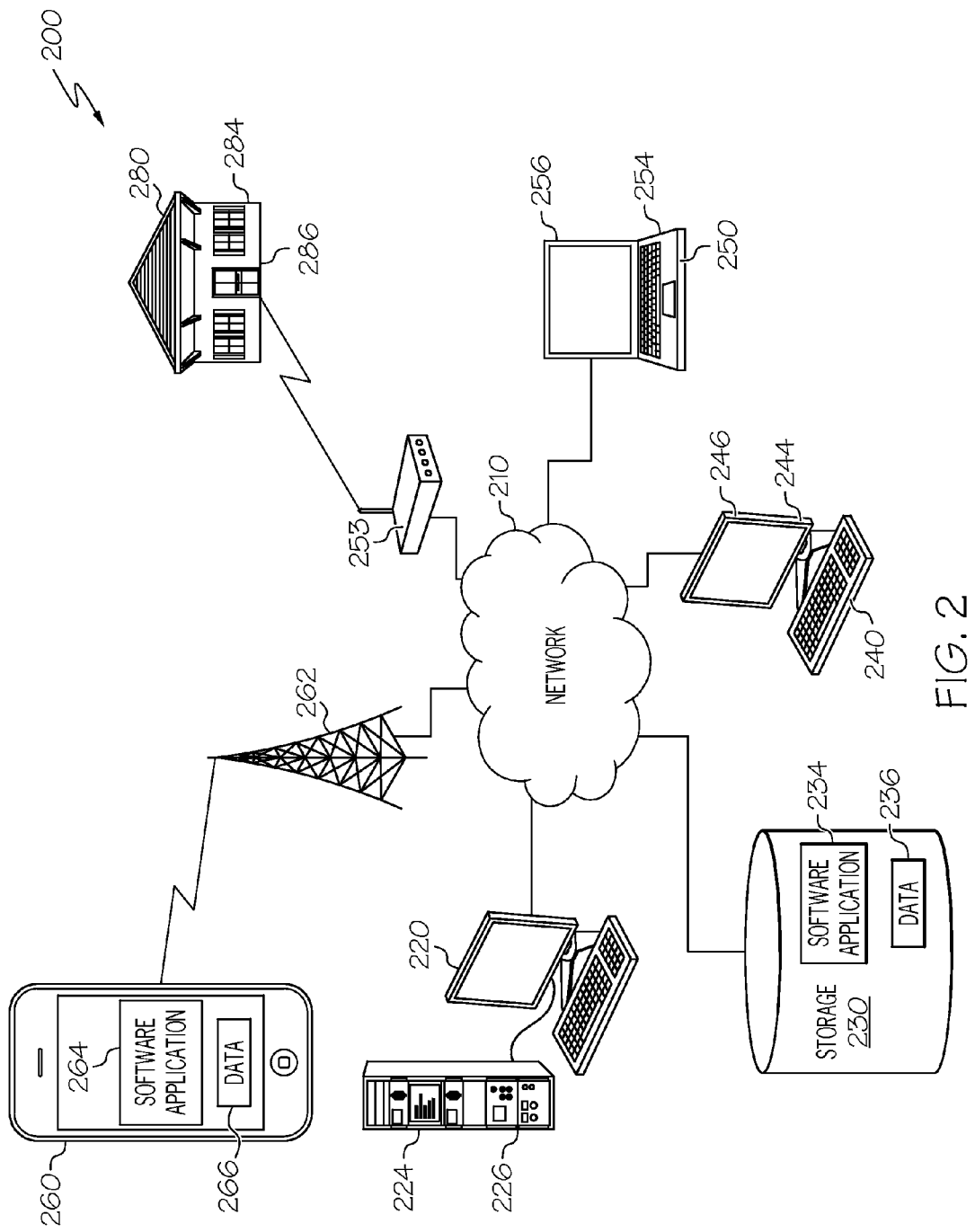
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 either directly or wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing the delivery of hot water to multiple nodes at selective temperatures or other software applications and data in accordance with embodiments described herein. Storage 230 may contain software application 234 and a content source such as data 236 for managing the delivery of hot water to multiple nodes at selective temperatures. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can manage the delivery of hot water to multiple nodes at selective temperatures.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
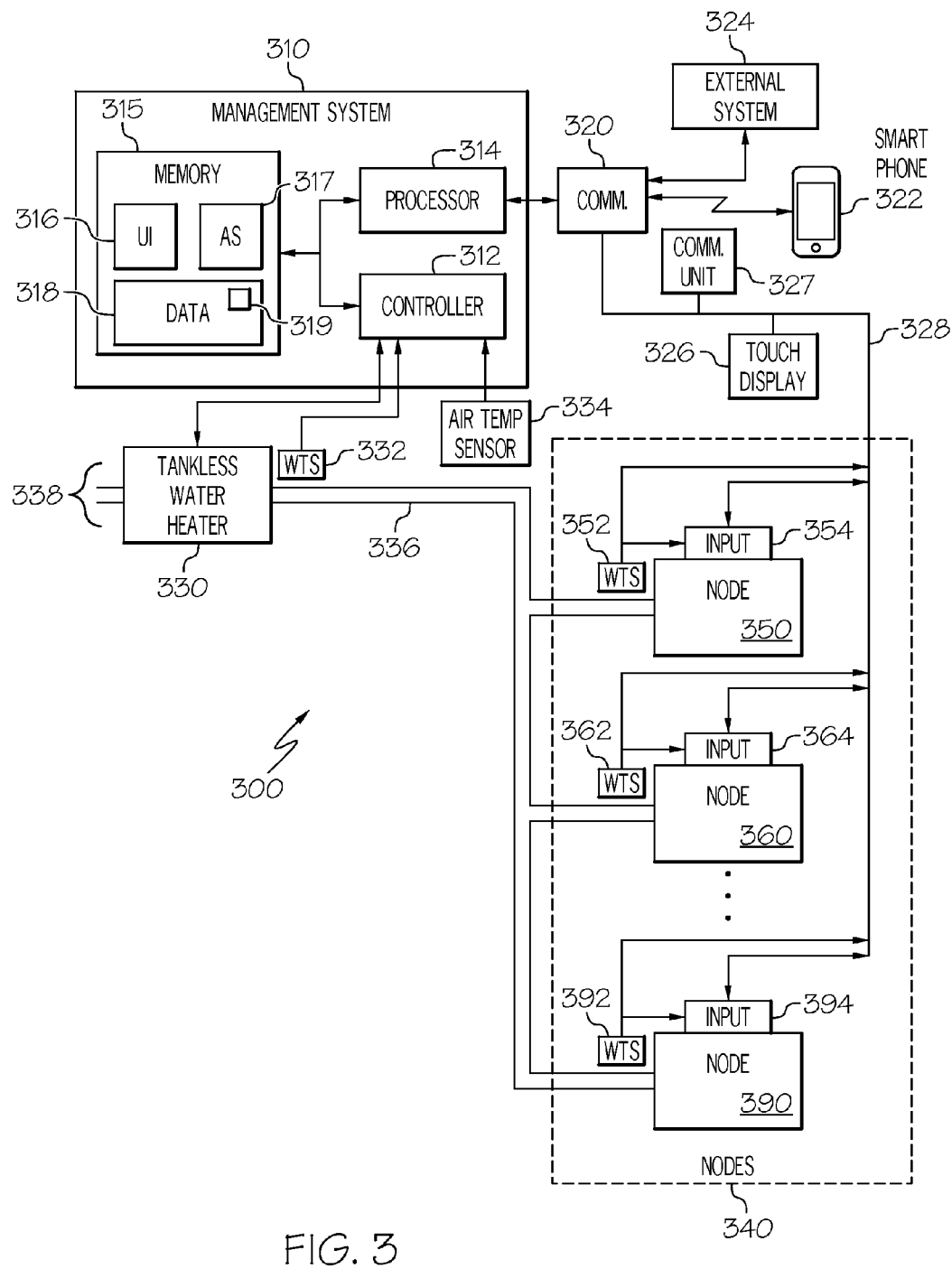
FIG. 3 is a block diagram of a hot water delivery system in accordance with a first embodiment.

FIG. 3 is a block diagram of a hot water delivery system 300 in accordance with a first embodiment. A management system 310 includes a controller 312, processor 314 and memory 315 in communication with each other. Controller 312 controls the operation of tankless water heater 330, receives inputs from the tankless water heater such as whether there is a demand for hot water, and receives additional inputs from water temperature sensor (WTS) 332 and air temperature sensor 334. Memory 315 includes a user interface (UI) 316, analytic software (AS) 317 and data 318. Analytic software 317 utilizes information from user interface 316 and data 318 to determine appropriate temperatures for each node at any given time taking into account factors such as ambient temperature. This information is stored in data 318 as a node database 319 and may be provided directly to controller 312. User interface 316 communicates through communications module 320 with user devices such as smartphone 322, external system 324, touch display 326, mobile communications unit 327, and various nodes 340. Touch display may be located in a central location or other accessible location. Touch display 326 may utilize a password based logon procedure to limit access to authorized persons (e.g. parent instead of children). Mobile communications unit 327 may be a mobile unit that communicates directly with the communications module 320 similar to a home mobile phone unit that communicates with a base unit. Data received from these sources may be stored in the node database in memory, passed to analytic software 317 for analysis, or passed directly to controller 312. Communications 320 provides connections between management system 310, nodes 340, users (such as through smartphone 322), external databases (such as on external system 324), touch display 326, etc. This could be accomplished wirelessly such as through Wi-Fi, Bluetooth, cellular, etc. or by being wired directly to various elements of the nodes or other devices.

Tankless water heater 330 is used to provide hot water on demand to nodes 340 through pipes 336 as instructed by controller 312. Although a tankless water heater is shown, in an alternative embodiment a small tank may be useful to provide a small buffer. In such a case, the water heater may be referred to as an on-demand water heater as the water is still heated as demanded. Even though a single water heater is shown, multiple water heaters may work together as a system to meet hot water demands. For example, multiple water heaters may be coupled together in series sharing the water heating load. In such a case, the controller may optimize the use of multiple water heaters depending on demand. For example, only a single water heater may be turned on for a given demand, or two heaters may be turned on at 60% of heating capacity each. Whether a single water heater or multiple water heaters, water is received for heating in inlet pipe 338 in this embodiment. Water temperature sensor 332 is located at the outlet of tankless water heater 330 to provide up to date temperature information to controller 312. Air temperature sensor 334 should be located strategically in an area where most water temperature loss should occur. For example, if the tankless water heater and most hot water pipes are located in the attic of the house, then the air temperature sensor should be similarly located. This allows the management system to better estimate the loss of water temperature between the tankless water heater and the nodes depending on the ambient temperature.

Nodes 340 include fixtures, appliances or other hot water outlets that receive hot water from a common water heater through a common water heater output, generally within a common structure such as a residence or commercial building. This can includes a dishwasher, clothes washer, showers, tubs, faucets, etc. For example, node 350 may be a dishwasher, node 360 a kitchen sink, and node 390 a master shower, each receiving hot water from tankless hot water heater 330 through pipe 336. Many additional nodes may be included to represent every hot water outlet that receives hot water from a common water heater through the common hot water heater output. Typically such nodes receive hot water in series, but they may also receive the hot water in parallel or some combination of series and parallel.

Nodes 350, 360 and 390 each include a water temperature sensor (WTS) 352, 362 and 392 and an input device 354, 364 and 394. Each of these water temperature sensors and inputs communicate through wire 328 and communications module 320 to management system 310. Alternative embodiments may utilize wireless connections for some or all of these sensors and input devices.

Water temperature sensors 352, 362 and 392 are located near the hot water intake for each node, thereby providing an accurate temperature reading of the hot water used by each node. This temperature can be compared with the temperature provided by WTS 332 to determine a heat loss that occurs in pipe 336 for each node. Water temperature sensors 352, 362 and 392 also communicate directly to input units 354, 364 and 394 in this embodiment.

Node input devices 354, 364 and 394 are devices for user input at each node. They can be integrated into an appliance such as a dishwasher or a clothes washer or built into a faucet controller where the user indicates a desire for hotter or colder water. For example, if a user is washing whites in hot water in the clothes washer, the selection of that use on the clothes washer would generate a signal to the management system. The user may also use a mobile phone or other input device to communicate with the management system user interface 316 a request for certain preset temperatures. For example, a user may set the water temperature at 120 degrees Fahrenheit (49 degrees Celsius) for the master shower or for whites being washed in hot water.

Node input devices may also receive signals from the management system such as the approved hot water temperature. If the water temperature sensor senses that the actual hot water temperature exceed the approved hot water temperature, the input device can add some cold water until the approved hot water temperature is achieved at the node. The input device would then inform the management system of this issue so the tankless water heater can be instructed to lower the hot water temperature. Once the water temperature sensor senses the lowered temperature, the input device can then reduce the cold water mixing with the hot water at the node.

An advantage of this embodiment is that water is generally not heated up and then mixed with cold water to cool it down at the node. This results in less heating of water, reducing energy usage significantly. Some hot water may be mixed with small amounts of cool water in situations such as where two nodes are demanding hot water at the same time where one requires hotter water than the other node such as described above. However, such mixing of cold water is minimal.

Alternative embodiments may not utilize input devices at each node. Instead preset temperatures may be used for each node unless the user provides input remotely through another device such as a smart phone, desktop computer, or through a centralized touch display or similar device.

FIG. 4 is a block diagram of a node database 400 in which various embodiments may be implemented. The temperatures shown in this figure are in Fahrenheit, although Celsius could also be used. Node database 400 includes a node identifier 405, a node type description 410, a preset temperature 415, a maximum temperature 420, an expected temperature drop 425, an ambient temperature factor 430, and a time delay 435 for that node. Some nodes may have multiple entries such as dishwashers and clothes washer, each with multiple settings. Even showers may have multiple settings for each person using that shower.

Node identifier 405 is used by the management system to track each node and associate that node with the appropriate data stored in node database 400. Node type description 410 is used by the management system user interface to describe a node in a form easily understandable by a user (e.g. master shower) and to provide a preset set of temperature settings for any node of that node type. Preset temperature 415 is the desired temperature for that node unless that temperature is overridden by the user at time of hot water usage such as through the node input device. Maximum temperature 420 is the maximum allowed for that node and cannot be overridden from a node input device. It may be overridden by a user through a centralized touch display or by remote access such as from a smart phone. For example, there may be a lower maximum temperature to a children's shower and sink for safety reasons. Preset temperature 415 and maximum temperature 420 are temperatures of the hot water at the node, not at the tankless water heater in this embodiment. Alternative embodiments may utilize the temperature at the tankless water heater instead.

Expected temperature drop 425 is the expected drop in temperature of hot water from the tankless water heater to the node for a given ambient temperature (e.g. 70 degrees Fahrenheit). This can be caused by heat loss through the pipes. Ambient temperature factor 430 is a factor showing the effects of ambient temperature on the heat loss for how water traveling to that node. For example, a factor of 1 degree would indicate a loss of 1 degree when the temperature is 10 degrees lower than 70 degrees, 2 degrees when the ambient temperature is 20 degrees lower than 70 degrees or 50 degrees. Alternative embodiments may utilize alternative types of factors for predicting heat loss due to ambient temperature for each node. Delay 435 is the expected time in seconds for hot water from the tankless water heater to fully reach the node. This allows for the management system to delay testing whether the desired temperature is achieved until the hot water has reached the node. Alternative embodiments may utilize alternative sets of variables.

Figure 5A:
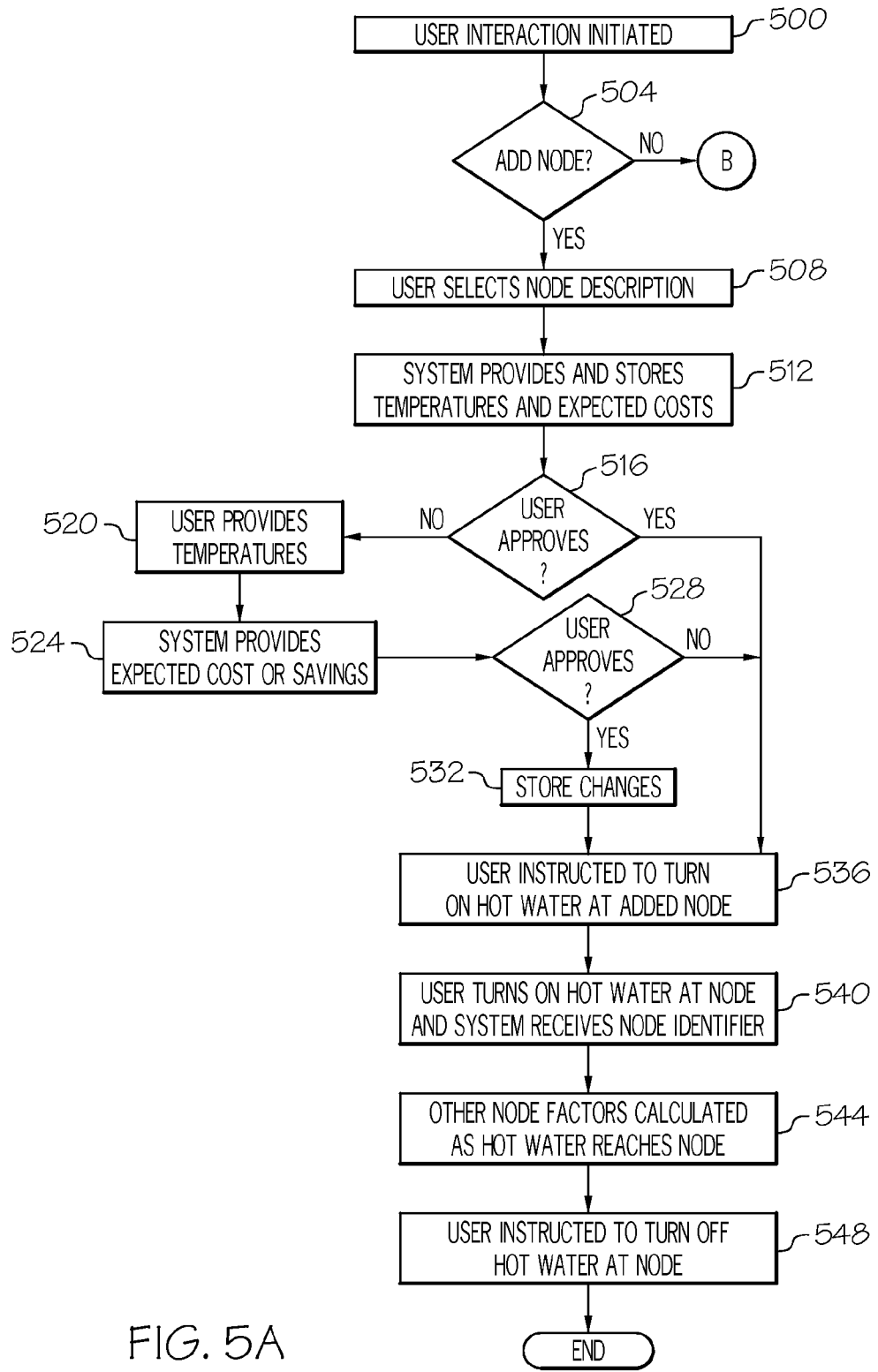
FIGS. 5A and 5B are a flow diagram of setting up or modifying the node database settings in which various embodiments may be implemented.
Figure 5B:
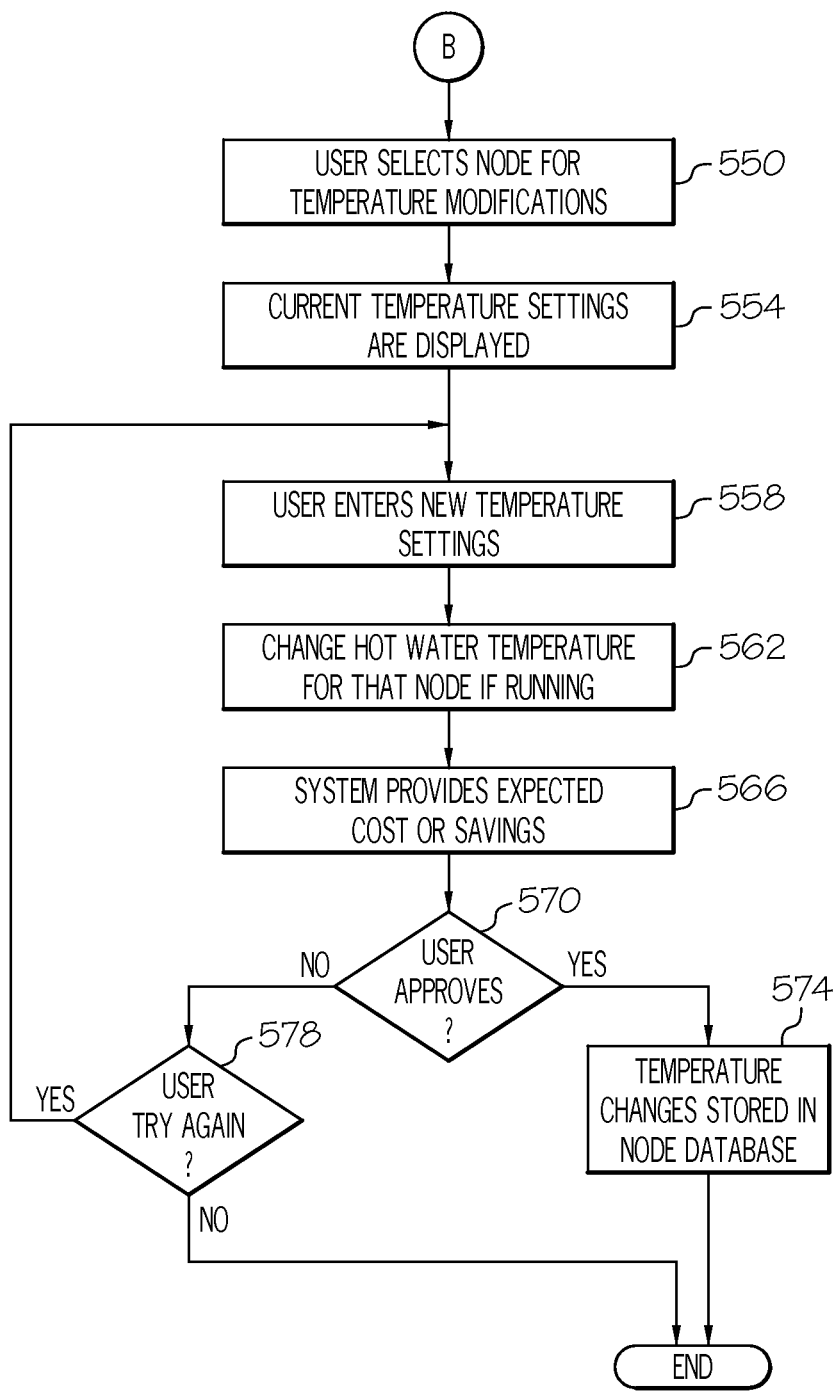

FIGS. 5A and 5B are a flow diagram of setting up or modifying the node database settings in which various embodiments may be implemented. FIG. 5A is directed to adding a node and FIG. 5B is directed to modifying the node database temperature settings for an existing node. A user can implement the initial steps of this process from a touch display, mobile communications unit or other direct input/output device with the management system or from a remote device such as a desktop computer or smartphone.

In a first step 500, a user interaction is initiated with the management system through the user interface. In a second step 504, it is determined whether the user desires to add a new node or modify an existing node. If a new node is desired by the user, then processing continues to step 508, otherwise processing continues to point B of FIG. 5B. In step 508, the user is provided and selects from a set of possible node type descriptions to choose from such as children's shower, kitchen sink, etc. Following a node type selection by the user, the system looks up and provides to the user a set of recommended temperatures included an expected monthly or annual cost for that type of node in step 512. This can be accomplished by reviewing a set of stored recommendations in memory or by obtaining recommendations from an external source such as a server located across the internet. Then in step 516 the user interface determines if the user approves the recommended temperatures. If yes, then processing continues to step 536, otherwise processing continues to step 520. In step 520, the user is allowed to manually enter temperatures for that node. The user interface then utilizes an external system to calculate and provide an estimates cost of savings of the changes to the recommended temperatures in step 524. This can include the local cost of electricity or gas, the average usage of hot water for a shower or a clothes wash cycle, etc. The user is then inquired in step 528 whether to approve the recommended changes given the estimated cost or savings of that change. If yes, then the changes are stored in the node database in step 532 and processing continues to step 536. If no in step 528, then processing continues to step 536 without any changes to the node database.

In step 536, the user is requested to proceed to the just added node to turn on the hot water at that node. In step 540, the user then turns on the hot water at that node. As a result of the hot water being turned on, the management system receives a signal from the input device at that node, thereby providing the identifier for that node, which is stored in memory with the node description and preset temperatures. The management system then in step 544 monitors the water temperature sensor at that node and the ambient temperature sensor to determine the time delay for hot water to reach that node, the temperature drop, and effect of ambient temperature, all of which is stored in the node database. The user is then instructed in step 548 to turn off the hot water at the node, then processing ceases for this session. If the user wants to further adjust the temperature of the water, the user can then initiate the user interface and select modifying an existing node.

FIG. 5B is directed to modifying the node database temperature settings for an existing node. This may be performed from a local touch display, a mobile communication unit or remotely from various devices such as from a smartphone. The user may wish to use a mobile device as will be explained below. From point B, FIG. 5B starts with step 550 where the user selects a node for node setting modifications from a list of existing nodes in the node database.

The user interface then displays the current settings in the node database for that node in step 554. The user can then select a new temperature setting for that node (preset temperature and maximum temperature) in step 558. In step 562, if the hot water is running for that node, the new user selected preset temperature will be sent to that node. This will allow the user to feel the temperature of the hot water just selected so the user can modify that temperature if desired. If the user is on a mobile device such as a mobile communications unit or a smartphone, then user can feel the water temperature and make changes without having to run back and forth to the touch display. In step 566, the user interface then utilizes an external system to calculate and provide an estimates cost of savings of the changes to the recommended temperatures. This can include the local cost of electricity or gas, the average usage of hot water for a shower or a clothes wash cycle, etc. The user is then inquired in step 570 whether to approve the recommended changes given the estimated cost or savings of that change. If yes, then the changes are stored in the node database in step 574 and processing ceases. If no in step 570, then the user is inquired in step 578 whether the user wants to try another temperature setting. If yes, the processing returns to step 558, otherwise processing exits.

Figure 6:
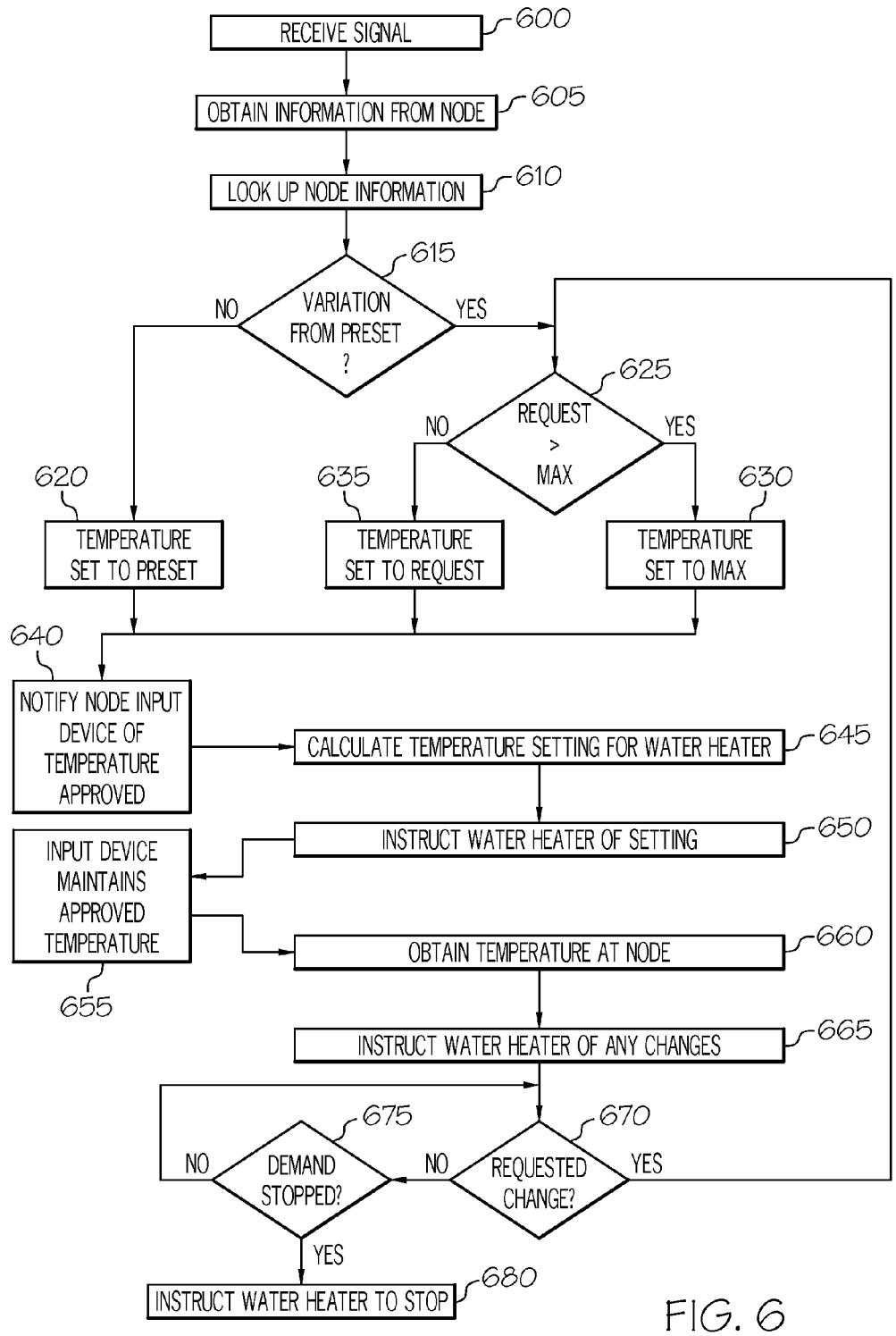
FIG. 6 is a flow diagram of the general operation of the hot water delivery system in accordance with the first embodiment.

FIG. 6 is a flow diagram of the general operation of the hot water delivery system in accordance with the first embodiment. In a first step 600, the management system receives a signal that a node has started to use hot water. This can be from an input device at any node or from the tankless water heater sensing that water is being drawn through the water pipes. Tankless water heaters have such a capability built in as that is when they turn on to heat water. In a second step 605, the management system obtains an identification of the node requesting hot water, the type of request (e.g. a clothes washer may specify hot water for whites in hot water), and any requested variation from the preset temperature. In this embodiment, this is a push system where the input device for the node seeking hot water notifies the management system. Alternatively, this could be a pull system where the tankless hot water system notifies the controller of a hot water demand and the management system makes an inquiry to the various nodes.

In step 610, the management system looks up node information in the node database including the node preset temperature, maximum temperature, temperature drop, ambient temperature factor and delay. In step 615, the management system determines whether there is a requested variation from the preset temperature. If not, then in step 620 the approved hot water temperature is set to the present amount for that node as indicated in the node database in memory, then processing continues to step 640. If yes in step 615, then processing continues to step 625 where the management system determines whether the requested variation is greater than the higher than the maximum temperature for than node. If yes in step 625, then processing continues to step 630 where the approved hot water temperature is set to the maximum temperature for that node and processing continues to step 640. If no in step 625, then in step 635 the approved hot water temperature is set to the requested variation and processing continues to step 640. In step 640 the node input device is notified of the approved temperature.

Subsequently in step 645, the management system calculates the required hot water temperature at the hot water heater (hot water heater setting) in order to meet the approved hot water temperature at the node requesting the hot water. Based on data in the node database, the expected drop in temperature for the requesting node is adjusted based on the ambient temperature sensed by ambient air temperature sensor and the result is added to the designated hot water temperature to determine the hot water heater setting.

Then in step 650, the tankless water heater is instructed by the management system controller to heat the water to the hot water heater setting.

The hot water is then delivered to the requesting node at the approved temperature in step 655. The node water temperature sensor then provides the temperature to the input device which can then mixes cold water with the incoming hot water if the approved temperature is exceeded. After the expected delay for that node, in step 660 the management system inquires the water temperature sensor for the requesting node to determine whether the desired temperature has been achieved and maintained. In step 665, the management system controller then makes adjustments as necessary by instructing the water heater to increase or decrease the output temperature of the heater. In step 670, the management system determines whether the node input device has requested a change in hot water temperature. If yes, then processing returns to step 625 above. If not, then in step 675 the management system determines whether the demand for hot water has stopped. If yes, then processing proceeds to step 680, otherwise processing returns to step 670. In step 680, the management system controller instructs the tankless water heater to stop heating water.

Not shown is where two or more nodes request hot water at the same time. In that case, the higher temperature of the two nodes is generally used as the hot water heater setting. The water temperature at the node with a lower approved hot water temperature may then rely upon its water temperature sensor and input device to add cold water to the node until the approved water temperature is achieved for that node. Alternatively, the user may mix the cold water manually using the faucet handles until the proper temperature is met. An exception to the higher temperature being used is when one of the nodes is a children's bathroom. In that case, the lower approved hot water temperature may be used for safety reasons.

Figure 7:
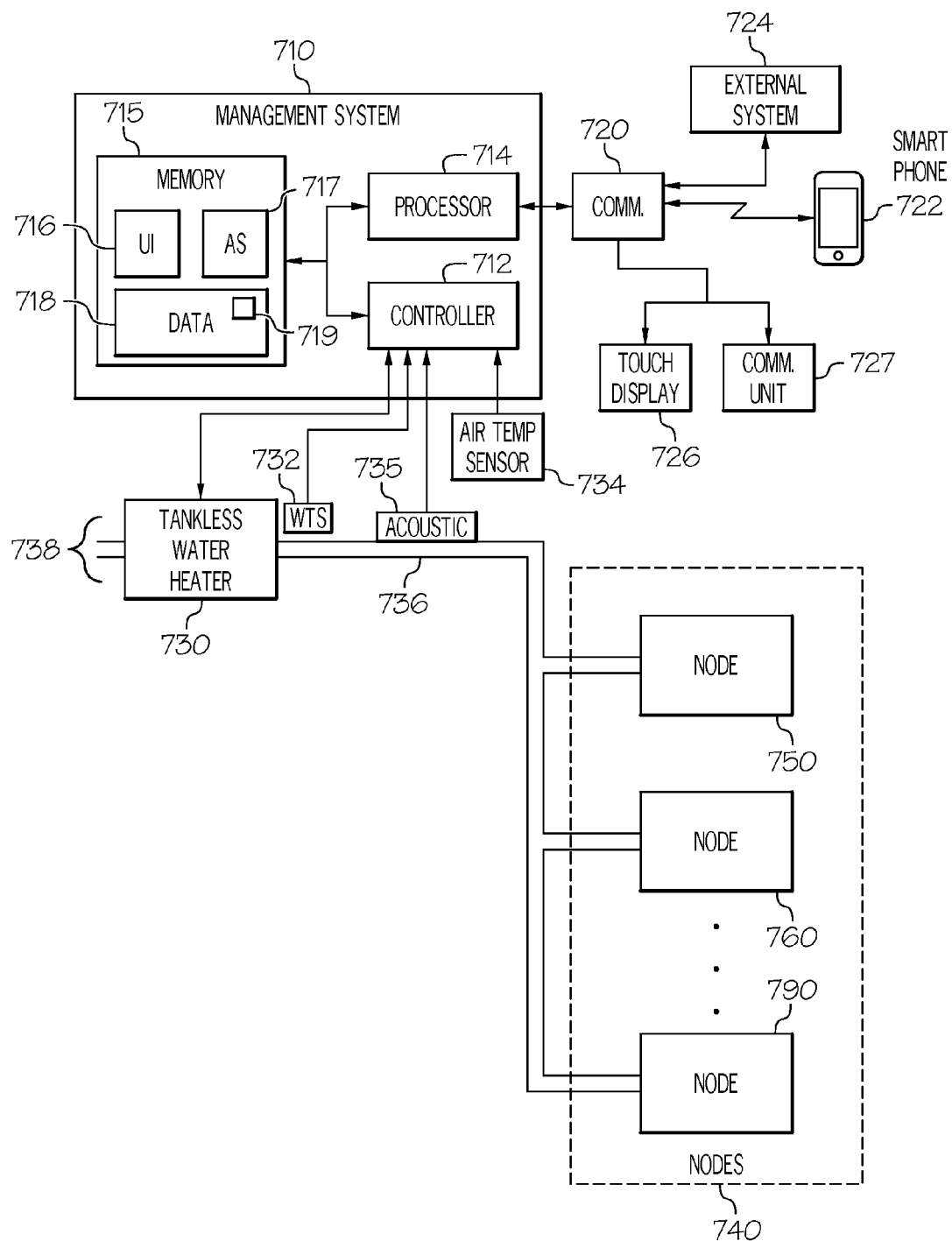
FIG. 7 is a block diagram of a hot water delivery system in accordance with a second embodiment.

FIG. 7 is a block diagram of a hot water delivery system in accordance with a second embodiment a management system 710 includes a controller 712, processor 714 and memory 715 in communication with each other. Controller 712 controls the operation of tankless water heater 730, receives inputs from the tankless water heater such as whether there is a demand for hot water, and receives additional inputs from water temperature sensor (WTS) 732, air temperature sensor 734, and optional acoustic sensor 735. Memory 715 includes a user interface (UI) 716, analytic software (AS) 717 and data 718. Analytic software 717 utilizes information from user interface 716 and data 718 to determine appropriate temperatures for each node at any given time taking into account factors such as ambient temperature. This information is stored in data 718 as a node database 719 and may be provided directly to controller 712. User interface 716 communicates through communications module 720 with user devices such as smartphone 722, external system 724, touch display 726, and mobile communications unit 727. Touch display may be located in a central location or other accessible location. Touch display 726 may utilize a password based logon procedure to limit access to authorized persons (e.g. parent instead of children). Mobile communications unit 727 may be a mobile unit that communicates directly with the communications module 720 similar to a home mobile phone unit that communicates with a base unit. Data received from these sources may be stored in the node database in memory, passed to analytic software 717 for analysis, or passed directly to controller 712. Communications module 720 provides connections between management system 710, users (such as through smartphone 722), external databases (such as on external system 724), touch display 726, etc. This could be accomplished wirelessly such as through Wi-Fi, Bluetooth, cellular, etc. or by being wired directly to various other devices.

Tankless water heater 730 is used to provide hot water on demand to nodes 740 through pipes 736 as instructed by controller 712. Water is received for heating in inlet pipe 738. Water temperature sensor 732 is located at the outlet of tankless water heater 730 to provide up to date temperature information to controller 712. Air temperature sensor 734 should be located strategically in an area where most water temperature loss should occur. For example, if the tankless water heater and most hot water pipes are located in the attic of the house, then the air temperature sensor should be similarly located. This allows the management system to better estimate the loss of water temperature between the tankless water heater and the nodes depending on the ambient temperature. Optional acoustic sensor 735 is utilized to sense which node is utilizing hot water based on noise of the water and pipes which node. Each type of fixture will have its own acoustic signature, which may be detected by acoustic sensor 735. This may take some training of the management system to accomplish. Without an acoustic sensor, a user may simply use a mobile communications unit or other communications device to indicate to the management system which node is utilizing hot water from the water heater.

Nodes 740 include fixtures or appliances that receive hot water from a common water heater, generally within a common structure such as a residence or commercial building. This can includes a dishwasher, clothes washer, showers, tubs, faucets, etc. For example, node 750 may be a dishwasher, node 760 a kitchen sink, and node 790 a master shower, each receiving hot water from tankless hot water heater 730 through pipe 736. Many additional nodes may be included to represent every hot water outlet that receives hot water from a common water heater. Typically such nodes receive hot water in series, but they may also receive the hot water in parallel or some combination of series and parallel.

Figure 8:
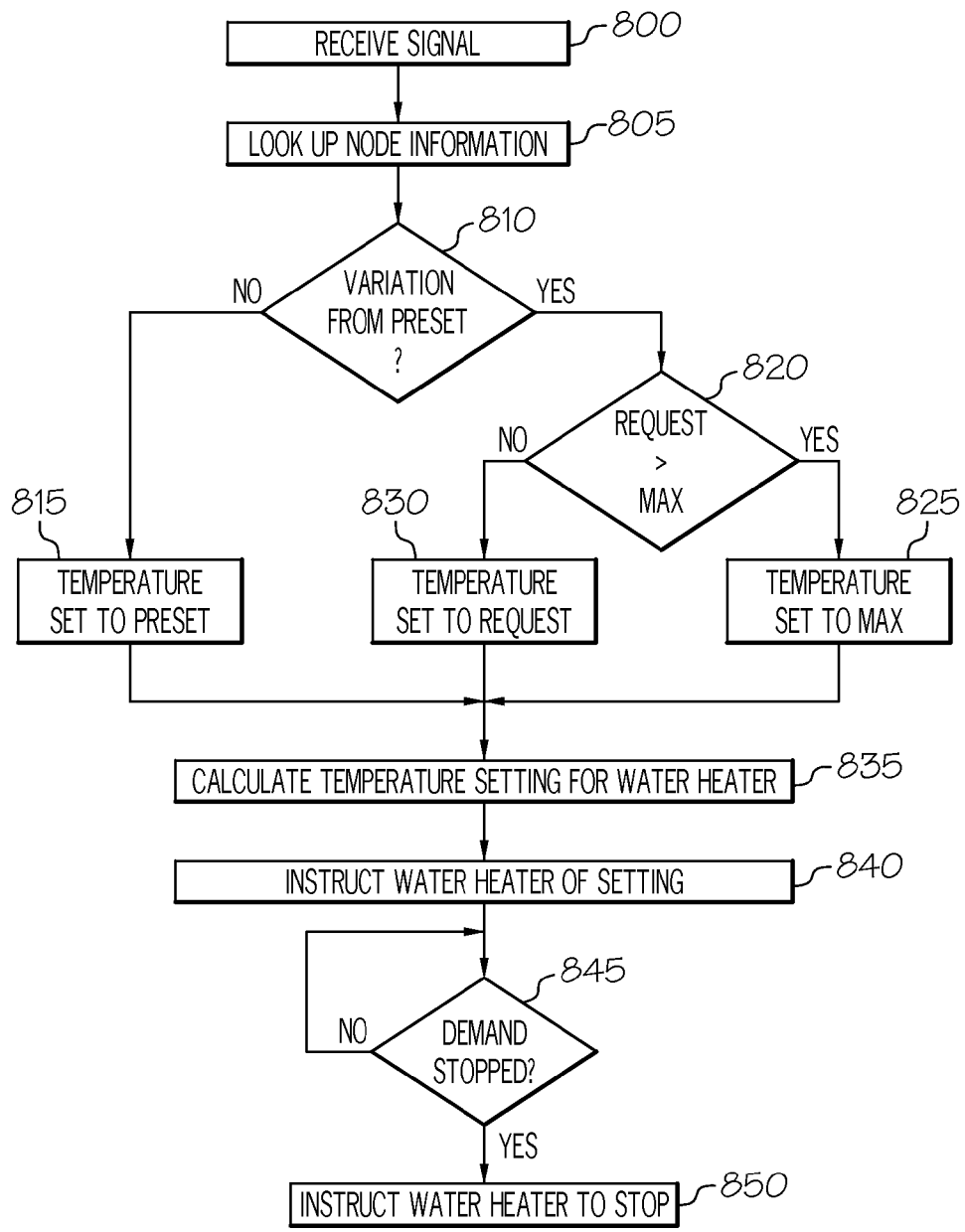
FIG. 8 is a flow diagram of the general operation of the hot water delivery system in accordance with the second embodiment.

FIG. 8 is a flow diagram of the general operation of the hot water delivery system in accordance with the second embodiment. In a first step 800, the management system receives a signal that a node has started to use hot water. This can be from the tankless water heater sensing that water is being drawn through the water pipes, from the acoustic sensor, or from a user mobile device. Tankless water heaters have such a capability built in as that is when they turn on to heat water. This signal would include an identification of the node requesting hot water and any requested variation from the preset temperature (e.g. such as when a mobile device is used).

In step 805, the management system looks up node information in the node database including the node preset temperature, maximum temperature, temperature drop, ambient temperature factor and delay. In step 810, the management system determines whether there is a requested variation from the preset temperature. If not, then in step 815 the approved hot water temperature is set to the present amount for that node as indicated in the node database in memory, then processing continues to step 835. If yes in step 810, then processing continues to step 820 where the management system determines whether the requested variation is greater than the higher than the maximum temperature for than node. If yes in step 820, then processing continues to step 825 where the approved hot water temperature is set to the maximum temperature for that node and processing continues to step 835. If no in step 820, then in step 830 the approved hot water temperature is set to the requested variation and processing continues to step 835.

Subsequently in step 835, the management system calculates the required hot water temperature at the hot water heater (hot water heater setting) in order to meet the approved hot water temperature at the node requesting the hot water. Based on data in the node database, the expected drop in temperature for the requesting node is adjusted based on the ambient temperature sensed by ambient air temperature sensor and the result is added to the designated hot water temperature to determine the hot water heater setting. Then in step 840, the tankless water heater is instructed by the management system controller to heat the water to the hot water heater setting. Then in step 845 the management system determines whether the demand for hot water has stopped. If yes, then processing proceeds to step 850, otherwise processing returns to step 845 where it is repeated until demand for hot water is stopped. In step 850, the management system controller instructs the tankless water heater to stop heating water.

Not shown is where two or more nodes request hot water at the same time. In that case, the higher temperature of the two nodes is generally used as the hot water heater setting. The water temperature at the node with a lower approved hot water temperature may then rely upon its water temperature sensor and input device to add cold water to the node until the approved water temperature is achieved for that node. Alternatively, the user may mix the cold water manually using the faucet handles until the proper temperature is met. An exception to the higher temperature being used is when one of the nodes is a children's bathroom. In that case, the lower approved hot water temperature may be used for safety reasons.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing the delivery of hot water to multiple nodes at selective temperatures. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for controlling a common on-demand hot water heater comprising:
   providing a plurality of hot water outlets for receiving hot water from the common on-demand hot water heater in a hot water delivery system, each hot water outlet having a corresponding node identifier, each node identifier stored in a centralized database with a corresponding preset outlet hot water temperature and a corresponding expected temperature drop from the common on-demand hot water heater to that hot water outlet;
   receiving a demand for hot water with a first node identifier at a first hot water outlet of the plurality of hot water outlets;
   utilizing the first node identifier to determine a heater output water temperature and an approved outlet water temperature based on the corresponding preset outlet hot water temperature and the corresponding expected temperature drop for the corresponding first hot water outlet from the centralized database;
   subsequent to determining the heater output water temperature, instructing the common on-demand hot water heater to heat water to the heater output water temperature based on the preset outlet hot water temperature and expected temperature drop from the common on-demand hot water heater to the first hot water outlet;
   providing hot water out of the common on-demand hot water heater at the heater output water temperature towards the first hot water outlet;
   utilizing the first node identifier to determine from the centralized database a time delay for hot water from the common on-demand hot water heater to reach the first hot water outlet at the approved outlet hot water temperature; and receiving water temperature feedback from the first hot water outlet after the time delay, wherein the feedback is utilized to determine whether the approved outlet hot water temperature has been achieved and maintained at the first hot water outlet; wherein the first hot water outlet provides hot water to a user at the approved outlet hot water temperature due to the expected temperature drop from the common on-demand hot water heater to the first hot water outlet.

2. The method of claim 1 further comprising monitoring the water temperature feedback at the first hot water outlet and an ambient temperature sensor to adjust the expected temperature drop from the common on-demand hot water heater to the first hot water outlet and to adjust the time delay for hot water to reach the first hot water outlet from the common on-demand hot water heater.

3. The method of claim 1 wherein the centralized database includes a set of hot water outlet types wherein each node identifier corresponds to one of the set of hot water outlet types, and wherein each hot water outlet type corresponds to a recommended hot water temperature for use as the preset hot water temperature for the hot water outlet type unless modified by a user.

4. The method of claim 1 wherein receiving the demand for hot water at a hot water outlet includes receiving a requested hot water temperature, wherein the centralized database includes a preset maximum hot water temperature for each node identifier, and wherein determining includes determining the approved outlet hot water temperature for the hot water outlet as equal to the lesser of the requested hot water temperature and a preset maximum hot water temperature stored in the database for the node identifier.

5. The method of claim 4 further comprising providing a user interface allowing a user to adjust settings for the preset hot water temperature and the maximum hot water temperature for each hot water outlet identified with a node identifier in the database; responsive to the user utilizing the user interface, presenting information to the user regarding potential cost savings of adjusted settings; and responsive to the user selection, automatically adjusting the settings reflecting the user selection.

6. The method of claim 1 wherein receiving a demand for hot water at a hot water outlet includes acoustically determining which of the plurality of hot water outlets is demanding the hot water based on noise of the water and pipes.

7. The method of claim 1 further comprising utilizing an ambient temperature sensor to adjust the expected temperature drop from the common on-demand hot water heater to the plurality of hot water outlets.

8. The method of claim 1 further comprising:
receiving a demand for hot water with a second node identifier at a second hot water outlet of the plurality of hot water outlets concurrent with receiving the demand for hot water at the first hot water outlet;
utilizing the second node identifier to determine a required heater output water temperature and an approved second outlet water temperature based on the corresponding preset outlet hot water temperature and the corresponding expected temperature drop for the corresponding second hot water outlet from the centralized database; and
if the required heater output water temperature is higher than the previously determined heater output water temperature and if there is not a maximum hot water temperature for the first hot water outlet for safety reasons, then:
set the heater output water temperature equal to the required heater output water temperature; and
mix cold water with the hot water at a the first hot water outlet to provide hot water at the approved hot water temperature to the user.

9. A computer usable program product comprising a computer usable storage medium including computer usable code for use in controlling an on-demand hot water heater, the computer usable program product comprising code for performing the steps of:
providing a plurality of hot water outlets for receiving hot water from the common on-demand hot water heater in a hot water delivery system, each hot water outlet having a corresponding node identifier, each node identifier stored in a centralized database with a corresponding preset outlet hot water temperature and a corresponding expected temperature drop from the common on-demand hot water heater to that hot water outlet;
receiving a demand for hot water with a first node identifier at a first hot water outlet of the plurality of hot water outlets;
utilizing the first node identifier to determine a heater output water temperature and an approved outlet water temperature based on the corresponding preset outlet hot water temperature and the corresponding expected temperature drop for the corresponding first hot water outlet from the centralized database;
subsequent to determining the heater output water temperature, instructing the common on-demand hot water heater to heat water to the heater output water temperature based on the preset outlet hot water temperature and expected temperature drop from the common on-demand hot water heater to the first hot water outlet;
providing hot water out of the common on-demand hot water heater at the heater output water temperature towards the first hot water outlet;
utilizing the first node identifier to determine from the centralized database a time delay for hot water from the common on-demand hot water heater to reach the first hot water outlet at the approved outlet hot water temperature; and receiving water temperature feedback from the first hot water outlet after the time delay, wherein the feedback is utilized to determine whether the approved outlet hot water temperature has been achieved and maintained at the first hot water outlet;
wherein the first hot water outlet provides hot water to a user at the approved outlet hot water temperature due to the expected temperature drop from the common on-demand hot water heater to the first hot water outlet.

10. The computer usable program product of claim 9 further comprising monitoring the water temperature feedback at the first hot water outlet and an ambient temperature sensor to adjust the expected temperature drop from the common on-demand hot water heater to the first hot water outlet and to adjust the time delay for hot water to reach the first hot water outlet from the common on-demand hot water heater.

11. The computer usable program product of claim 9 wherein the centralized database includes a set of hot water outlet types wherein each node identifier corresponds to one of the set of hot water outlet types, and wherein each hot water outlet type corresponds to a recommended hot water temperature for use as the preset hot water temperature for the hot water outlet type unless modified by a user.

12. The computer usable program product of claim 11 wherein receiving the demand for hot water at a hot water outlet includes receiving a requested hot water temperature, wherein the centralized database includes a preset maximum hot water temperature for each node identifier, and wherein determining includes determining the approved outlet hot water temperature for the hot water outlet as equal to the lesser of the requested hot water temperature and a preset maximum hot water temperature stored in the database for the node identifier.

13. The computer usable program product of claim 12 further comprising providing a user interface allowing a user to adjust settings for the preset hot water temperature and the maximum hot water temperature for each hot water outlet identified with a node identifier in the database; responsive to the user utilizing the user interface, presenting information to the user regarding potential cost savings of adjusted settings; and responsive to the user selection, automatically adjusting the settings reflecting the user selection.

14. A data processing system for use in controlling an on-demand hot water heater, the data processing system comprising:
   a processor; and
   a memory storing program instructions which when executed by the processor execute the steps of:
   providing a plurality of hot water outlets for receiving hot water from the common on-demand hot water heater in a hot water delivery system, each hot water outlet having a corresponding node identifier, each node identifier stored in a centralized database with a corresponding preset outlet hot water temperature and a corresponding expected temperature drop from the common on-demand hot water heater to that hot water outlet;
   receiving a demand for hot water with a first node identifier at a first hot water outlet of the plurality of hot water outlets;
   utilizing the first node identifier to determine a heater output water temperature and an approved outlet water temperature based on the corresponding preset outlet hot water temperature and the corresponding expected temperature drop for the corresponding first hot water outlet from the centralized database;
   subsequent to determining the heater output water temperature, instructing the common on-demand hot water heater to heat water to the heater output water temperature based on the preset outlet hot water temperature and expected temperature drop from the common on-demand hot water heater to the first hot water outlet;
   providing hot water out of the common on-demand hot water heater at the heater output water temperature towards the first hot water outlet;
   utilizing the first node identifier to determine from the centralized database a time delay for hot water from the common on-demand hot water heater to reach the first hot water outlet at the approved outlet hot water temperature; and receiving water temperature feedback from the first hot water outlet after the time delay, wherein the feedback is utilized to determine whether the approved outlet hot water temperature has been achieved and maintained at the first hot water outlet;
   wherein the first hot water outlet provides hot water to a user at the approved outlet hot water temperature due to the expected temperature drop from the common on-demand hot water heater to the first hot water outlet.

15. The data processing system of claim 14 further comprising monitoring the water temperature feedback at the first hot water outlet and an ambient temperature sensor to adjust the expected temperature drop from the common on-demand hot water heater to the first hot water outlet and to adjust the time delay for hot water to reach the first hot water outlet from the common on-demand hot water heater.

16. The data processing system of claim 14 wherein the centralized database includes a set of hot water outlet types wherein each node identifier corresponds to one of the set of hot water outlet types, and wherein each hot water outlet type corresponds to a recommended hot water temperature for use as the preset hot water temperature for the hot water outlet type unless modified by a user.

17. The data processing system of claim 16 wherein receiving the demand for hot water at a hot water outlet includes receiving a requested hot water temperature, wherein the centralized database includes a preset maximum hot water temperature for each node identifier, and wherein determining includes determining the approved outlet hot water temperature for the hot water outlet as equal to the lesser of the requested hot water temperature and a preset maximum hot water temperature stored in the database for the node identifier.

18. The data processing system of claim 17 further comprising providing a user interface allowing a user to adjust settings for the preset hot water temperature and the maximum hot water temperature for each hot water outlet identified with a node identifier in the database; responsive to the user utilizing the user interface, presenting information to the user regarding potential cost savings of adjusted settings; and responsive to the user selection, automatically adjusting the settings reflecting the user selection.

* * * * *